US006813708B2

(12) United States Patent
Smith et al.

(10) Patent No.: US 6,813,708 B2
(45) Date of Patent: Nov. 2, 2004

(54) SYSTEM AND METHOD FOR SEARCHING A BIOS FOR A TYPE OF COMPUTER NETWORK DRIVE TO BOOT AND AN OPERATING SYSTEM FOR MIGRATING AN OPERATING SYSTEM TO A COMPUTER

(75) Inventors: Brandon M. Smith, Tulsa, OK (US); Darrel G. Pearson, Sperry, OK (US)

(73) Assignee: Electronic Data Systems Corporation, Plano, TX (US)

( * ) Notice: Subject to any disclaimer, the term of this patent is extended or adjusted under 35 U.S.C. 154(b) by 31 days.

(21) Appl. No.: 10/282,582

(22) Filed: Oct. 29, 2002

(65) Prior Publication Data

US 2004/0083355 A1 Apr. 29, 2004

(51) Int. Cl.[7] .................................................. G06F 9/00
(52) U.S. Cl. ......................................... 713/1; 717/174
(58) Field of Search ........................ 713/1, 2; 707/204; 717/174

(56) References Cited

U.S. PATENT DOCUMENTS

| | | | |
|---|---|---|---|
| 5,416,694 A | | 5/1995 | Parrish et al. ............... 364/401 |
| 5,795,155 A | | 8/1998 | Morrel-Samuels .......... 434/107 |
| 5,870,554 A | * | 2/1999 | Grossman et al. ............. 713/2 |
| 5,951,684 A | * | 9/1999 | Jeon .............................. 713/1 |
| 6,007,340 A | | 12/1999 | Morrel-Samuels .......... 434/236 |
| 6,170,056 B1 | * | 1/2001 | Sidie .............................. 713/2 |
| 6,275,812 B1 | | 8/2001 | Haq et al. ..................... 705/11 |
| 6,357,002 B1 | * | 3/2002 | Lupo et al. ..................... 713/1 |
| 6,490,677 B1 | * | 12/2002 | Aguilar et al. ................. 713/1 |
| 6,532,538 B1 | * | 3/2003 | Cronk et al. .................. 713/2 |
| 6,546,404 B1 | * | 4/2003 | Davis et al. ................ 707/204 |
| 6,658,562 B1 | * | 12/2003 | Bonomo et al. ............... 713/1 |
| 6,754,818 B1 | * | 6/2004 | Lee et al. ...................... 713/2 |

FOREIGN PATENT DOCUMENTS

JP  09146651 A  *  6/1997  ............. G06F/1/00

OTHER PUBLICATIONS

Stevens Richard W, TCP/IP Illustrated vol. 1, 1994, pp. 419–423.*

* cited by examiner

Primary Examiner—Thomas Lee
Assistant Examiner—Mark Connolly
(74) Attorney, Agent, or Firm—William N. Hulsey, III

(57) ABSTRACT

A method and system for migrating a computer operating system to a personal computer includes the process of and instructions for detecting dynamically the type of disk operating system (DOS) network device to be booted by an associated DOS network by examining or parsing the contents of the personal computer CMOS/BIOS. The invention dynamically selects the proper image for the personal computer in a function of information within the computer's CMOS/BIOS. In response to this information, the system of the present invention automatically backs up user data files resident on the personal computer to a remote location via a computer network and installs the operating system to which the migration is to occur in the personal computer. Thereafter, the system dynamically restores the user data files from the remote location.

26 Claims, 2 Drawing Sheets

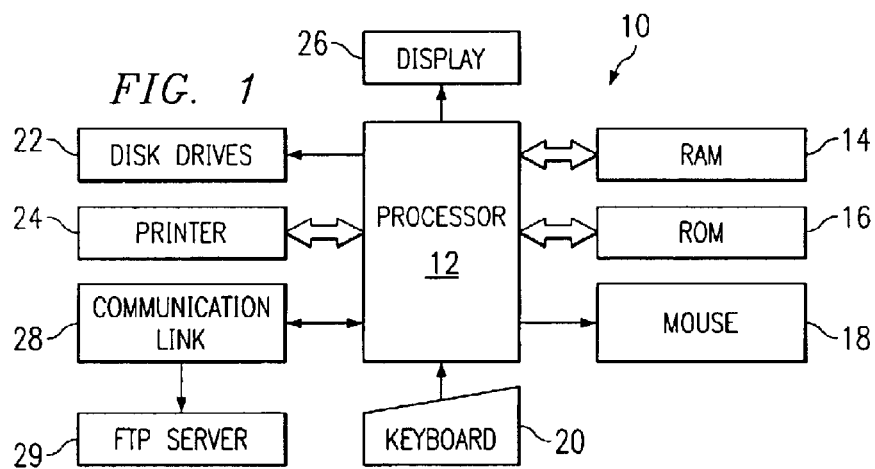
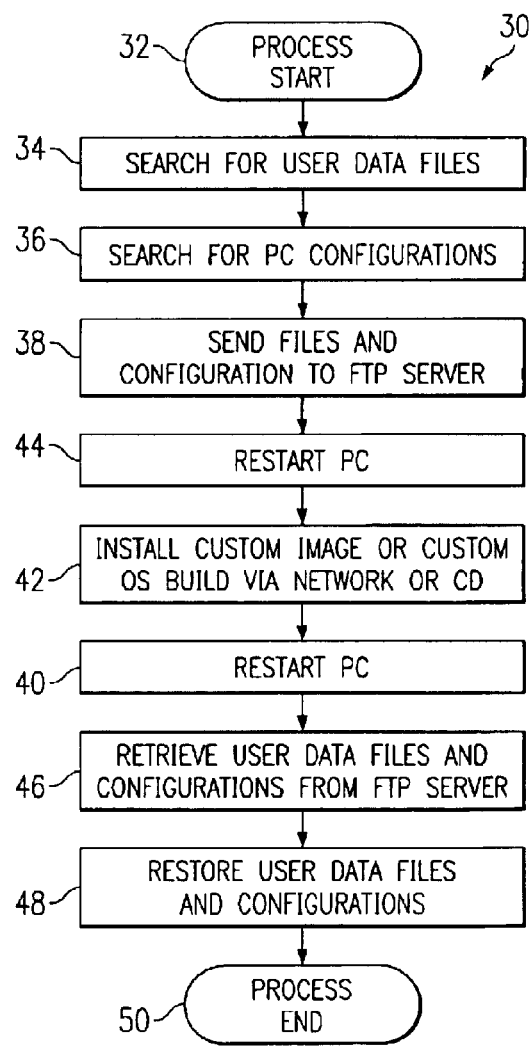

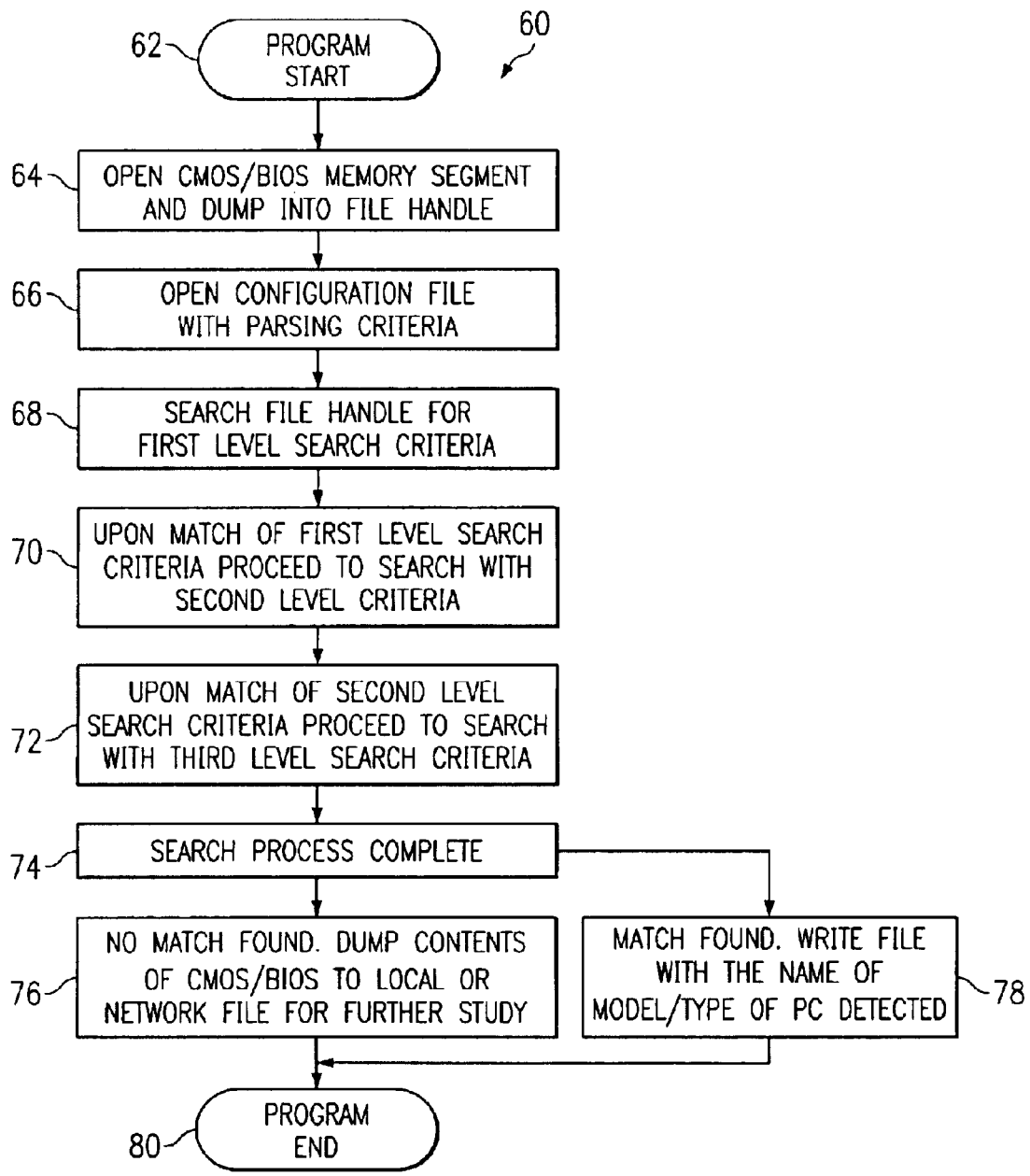

SYSTEM AND METHOD FOR SEARCHING A BIOS FOR A TYPE OF COMPUTER NETWORK DRIVE TO BOOT AND AN OPERATING SYSTEM FOR MIGRATING AN OPERATING SYSTEM TO A COMPUTER

TECHNICAL FIELD OF INVENTION

The invention, in general, relates to a method and system for migrating an operating system to a personal computer. More specifically, the invention relates to a single, integrated method and system for migrating a computer operating system to a personal computer that includes the process of and instructions for detecting dynamically the type of disk operating system (DOS) network device to be booted by an associated DOS network by examining the content of the personal computer's CMOS/BIOS, and dynamically selecting the proper image for the personal computer as a function of information with the CMOS/BIOS.

BACKGROUND OF THE INVENTION

Personal computer operating system operations, such as operating system installation or replacement typically occur through a complete copying or "cloning" of a computer's hard disk, followed by operating system augmentation using various software distribution tools. In this process, information systems specialists within an organization create a standard personal computer build. Such a build may, for example, include the computer operating system, a web browser, and an electronic mail system, as well as, various contacts, scheduling, document management, time reporting, and other applications. Unfortunately, by the time all of the various details relating to the organization's specific personal computer applications are modified and adapted for the particular build, the information systems specialists generally end up spending significant amounts of time and effort in fully implementing the build. Moreover, a cloning operation generally only has use during the initial personal computer operating system build. At later points in the personal computer or information systems life cycles, even the "all-or-nothing" cloning operation, will not produce acceptable results.

There is a need, consequently, to effectively reduce costs and improve the personal computer management process as it relates to the migration of operating systems and supported application programs. One approach to address this problem has been to use remote boot servers to implement logical builds, not only during the life cycle of a given type of computer or system of computers, but also across different types of computers made by different manufacturers, all operating with the same organization. While the remote boot server concept has appeal, a number of hardware instrumentation barriers thwart the widespread acceptance of this approach.

Remote boot server technology, for instance, requires a central server or set of servers to hold personal computer configurations for all of an organization's users. Instead of booting from the master boot record on a local hard disk, the personal computer boots from a remote server. This process eases major configuration changes, such as the operating system installation, as well as minor changes such as various software patches. In such a system, a network server stores one copy of each operating system and application, which operating system may be deployed in a number of different computer types and different user profiles within the organization.

Although this approach has advantages over the cloning process, problems with this approach include that to implement the operating system installation, there must be a pre-boot execution (PXE) agent resident in the basic input/output system (BIOS) of each personal computer. Without the PXE, the information technology specialist must add an EPROM or use a boot floppy disk for each personal computer on which he is installing the new/modified operating system.

Another problem with remote boot servers is the requirement for a robust network connection and the requirements of creating installation packages for the various applications to be operated on the personal computer.

As a result, there is a need for a more flexible approach than either disk cloning or remote boot server migration for ongoing support and personal computer system management.

Presently, some approaches exist to address the problem of employing a new operating system or image on a personal computer desktop or laptop attempt for migrating user files, settings, and applications from one operating system to another. Unfortunately, the known solutions generally only back up user data files and file settings during and initial installation of the operating system and the associated computer applications. Such approaches, for example, may store user file settings and, in some cases, personal computer applications. However, these approaches cannot install the applications, instead they rely upon a remote boot server for this portion of the migration.

There, consequently, is a need for a single, integrated method and system for performing fully automated migration of personal computer operating systems and related applications.

A need exists for such a system and method of operating such a system that provide for both automated and scripted or controlled backup of user personal computer files.

A further need exists for a method and system for automated personal computer operating system migration that provides for automatic data retrieval with simplified, or at least readily achievable, back-end requirements for avoiding the specialized remote boot server operations of existing approaches.

Still, a need exists for an automated personal computer operating system migration method and system that permit operating systems and associated applications delivery via a computer network or CD-ROM, without the need for a PXE or similar hardware and/or software requirements.

A need exists for a personal computer operating system migration utility capable of automated use with a wide variety of personal computers from a wide variety of personal computer manufacturers.

Yet a further need exists for a method and system for migrating a new personal computer operating system and associated applications that, in a single integrated process or system, provides for back up of user data files, remote storage of data, operating system delivery, and restoration of user data files.

SUMMARY OF THE INVENTION

In accordance with the present invention, a method and system for migrating an operating system to a personal computer is provided that substantially eliminates or reduces the disadvantages and problems associated with prior operating system migration methods and systems.

According to one aspect of the present invention, there is provided a system for migrating a computer operating system to a personal computer that avoids the limitations of cloning the hard disk or using a remote boot server in association with a PXE or similar file. The system of the present invention in one embodiment includes the necessary instructions for detecting dynamically the type of disk operating system (DOS) network device to be booted by an associated DOS network by examining or parsing the contents of the personal computer CMOS/BIOS. The system further dynamically selects the proper image for the personal computer in a function of information with the CMOS/BIOS. Further aspects of the system of the present invention include instructions to backup of user data files on the personal computer to a remote location via a computer network and install the new operating system in the personal computer. The system further provides the ability to dynamically restore the user data files from the remote location.

A technical advantage of the present invention is the ability to effectively reduce costs and improve the personal computer management process. The present invention provides for a more flexible approach than the "all-or-nothing" approach of disk cloning and the more difficult remote boot server approach for ongoing support and personal computer system management.

Another technical advantage of the present invention is its ability to perform a fully automated migration of personal computer operating systems and related applications on a single, integrated manner. The present invention provides for both automated and scripted or controlled backup of user personal computer files.

A technical advantage of the present invention includes its providing an automated personal computer operating system migration that automatically retrieves data with simplified, or at least readily achievable, back-end requirements. Still, further, the present invention provides for an automated personal computer operating system migration method and system that permits operating systems and associated applications delivery via a computer network or CD-ROM, without the need for a PXE or similar hardware or software requirements.

Yet another technical advantage of the present invention is a personal computer operating system migration utility capable of automated use with a wide variety of personal computers from a wide variety of personal computer manufacturers. The present method and system permit migrating a new personal computer operating system and associated applications using a single integrated process or system, that backs up user data files, remotely stores data, delivers the operating system, and restores user data files.

In summary, the present invention provides an operating system and related applications migration facility for use across a wide variety of operating system environments, making highly practical a fully managed computer working environment with a full range of information services and full range of personal computers. As a result of the present invention, whenever an organization faces the situations of operating system upgrades, image refreshes, or new personal computer deployments occur, the present invention provides the benefit of reduced time and effort information systems specialists. A technical advantage, therefore, of the present invention includes significant cost and time savings in maintaining the most current and operable information systems and related services environment for those organizations employing its valuable innovations.

Other technical advantages are readily apparent to one skilled in the art from the following figures, description, and claims.

BRIEF DESCRIPTION OF THE DRAWINGS

For a more complete understanding of the present invention and advantages thereof, reference is now made to the following description taken in conjunction with the accompanying drawings in which like reference numbers indicate like features and wherein:

FIG. 1 illustrates a general purpose computer that may be used in a personal computer system implementing the operating system migration processes and functions of the invention;

FIG. 2 conceptually shows the personal computer operating system migration process performed consistent with the teachings of the present invention; and FIG. 3 depicts the CMOS/BIOS parsing operation for determining the detecting dynamically the type of disk operating system (DOS) network device to be booted by an associated DOS network and selecting the proper image for the personal computer.

DETAILED DESCRIPTION OF PREFERRED EMBODIMENT

The preferred embodiment of the present invention and its advantages are best understood by referring to FIGS. 1 through 3 of the drawings, like numerals being used for like and corresponding parts of the various drawings.

FIG. 1 illustrates a general-purpose computer 10 that may be used in a personal computer operating system migration system constructed in accordance with the invention. General-purpose computer 10 may be used to execute distributed applications and/or distributed and individually operating system services through an operating system loaded in accordance with the invention. General-purpose computer 10 may be used as a stand-alone computer or as part of a larger, networked system of personal computers. Here, FIG. 1 provides an understanding of how one might interface and use the system of the present invention. General-purpose computer 10 may be adapted to execute any of the well-known operating systems OS2, UNIX, MAC-OS, and WINDOWS operating systems or other operating systems. Through use of the present invention, general-purpose computer 10 may readily support the migration from any one of such operating systems to another, provided that the applications have themselves the ability to operate with the different operating systems.

General-purpose computer 10 includes processor 12, random access memory (RAM) 14, read-only memory (ROM) 16, mouse 18, keyboard 20, and input/output devices such as disk drives 22, printer 24, display 26, and communications link 28. The present invention includes programs that may be stored in RAM 14, ROM 16, or disk drives 22 and may be executed by processor 12. Communications link 28 connects to FTP server 29, but may general-purpose computer 10 may connect to FTP server 29 via a telephone line, an antenna, a gateway or any other type of communications link. Disk drives 22 may include a variety of types of storage media, such as, for example, floppy disk drives, hard disk drives, CD ROM drives or magnetic tape drives.

Although the embodiment of FIG. 1 employs a plurality of disk drives 22, a single disk drive 22 may be used without departing from the scope of the invention. FIG. 1, therefore, only provides one example of a computer that may be used with the invention. The invention may be used in computers other than general-purpose computers, as well as on general-purpose computers 10 without conventional operating systems, which operating system may be installed using the teachings of the present invention.

The present invention addresses the problem that deployment of a new operating system or image on a personal computer and the associated re-configuration and data migration has become more complex and consequently more time-consuming and costly. Addressing the problem of rapidly changing technology and a lack of sufficient information system technical talent, the present invention provides the ability to backup user data files, detect and save current network settings, remove the old images, install the new image, restore backed up files, and restore network settings. The process of the present invention requires significantly less oversight and monitoring. The present invention reduces, or essentially eliminates the time-consuming steps of manually reestablishing the general-purpose computer 10's "DNA" or personality (e.g., user personal settings, application settings, contacts, calendar, personal preferences, profiles, etc.).

The present invention provides a unique re-boot capability and significantly greater data migration speed. To illustrate principal concepts of the present invention, FIG. 2 shows one embodiment of operating system migration process 30 of the present invention. Referring to FIG. 2, process 30 may begin at process start step 32. After process initiation, the present invention searches for user data files on general-purpose computer 10, for example, at step 34. Upon finding the appropriate data files, process 30 searches for computer 10 configurations at step 36. Such configurations are also known as the computer DNA or personality. Sending user data files and computer configuration data to FTP server 29 occurs at step 38.

Process 30 then restarts computer 10 at step 40. Installing a custom image or custom operating system build may occur at step 42. This may occur either remotely from a server connecting to computer 10 through communications link 28 or from a CD-ROM via disk drives 22. Thereafter, at step 44, the process restarts computer 10.

After restarting computer 10, the process retrieves user data files and configurations from the remote location using the FTP server at step 46. Restoring user data files and configurations takes place at step 48, following which process end step 50 occurs.

The operating system migration process 30 solves the problem of time-consuming operating system migration by fully automating the backing up of user files and configurations, installing the new operating system, or image, and then restoring the files and configurations. This utility only requires an FTP server on the local network with enough disk space to hold the amount of data to be backed up. The new operating system or image may then be loaded from FTP server 29 or from a compact disk through disk drive 22.

To use general-purpose operating system migration process 30, operating computer 10 is first configured for the new operating system or image, and for any additional customer applications to be maintained on general-purpose computer 10. Also, file extensions for user files to be backed up may be specified through a graphical user interface, or a configuration file.

The operation of operating system migration process 30 may be even more fully appreciated through the following description. Thus, upon installing the instructions for performing process 30, utility execution occurs on general-purpose computer 10. This step prompts the user to insert a DOS boot disk and, if applicable, a compact disk containing the operating system or image in disk drives 22. At this point the operating system migration process 30 becomes a totally unattended process. These steps may be viewed all as part of process start step 32.

Next, operating system migration process 30 searches for the files (step 34) and configurations resident within general-purpose computer 10. Once search step 34 finishes, process 30 opens an FTP session at FTP server 29 to store and verify critical user information (step 38).

General-purpose computer 10 may then be restarted from the DOS boot disk (step 36). Next, the re-imaging process will install the new operating system or image using an image clone or an attended install (step 42). In the preferred embodiment, at this step 42, the present invention performs the important step of altering the contents of the DOS boot disk. This causes process 30 to redirect the boot process to the hard drive, which at this point will contain the boot information for the new operating system.

A principal advantage of this step of altering the contents of the DOS boot disk is ensuring an unattended and seamless flow of events, even during system restart, which occurs at step 44.

Retrieval process step 46 runs next. At retrieval step 46, general-purpose computer 10 connects via communication links 28 to FTP server 29 to retrieve the information about the user data files and configurations that process 30 will retrieve. The user data files preferably will be in a folder named after the general-purpose computer 10 MAC addresses, although process 30 may, alternatively, use another naming convention. Once process 30 verifies the information to be proper process 30 restores user data files and configurations at step 48. The user data files may be downloaded from FTP server 29 and placed in their appropriate locations within general-purpose computer 10. Afterward process 30 will return to FTP server 29 to download the user data files and the user's custom configurations from the previous operating system. Retrieval step 46 migrates all files and configurations to the standard of the new operating system. Therefore, all of the user's file locations and settings will be identical to their previous configuration with the prior operating system. Confirmation of the completion of these various steps within the retrieval process end step 50.

FIG. 3 illustrates in yet further detail CMOS/BIOS parsing process 60 of the preferred embodiment. CMOS/BIOS parsing process 60 dynamically examine the CMOS/BIOS of computer 10 to detect dynamically the type of disk operating system (DOS) network device to be booted by an associated DOS network, as well as select dynamically the proper image for the personal computer as a function of information with the CMOS/BIOS.

Process 60, in one embodiment, starts at step 62, and thereafter reads the computer CMOS/BIOS. Reading the 64K memory segment of the CMOS/BIOS and dumping that memory segment into a file handler occurs at step 64. This permits searching through the CMOS/BIOS. In the same folder is an encrypted configuration file with all the computer vendor information and related model information. The process then opens the configuration with parsing criteria at step 66, and begins searching the file handle for first level search criteria at step 68. The search may occur down to a number of different layers. The number of layers, while essentially limitless, depends on the amount of data in the particular configuration file. The process will enumerate the matching data and continue until all the necessary data and levels of data are determined.

For example, at the first level of search, step 70, the present embodiment may search for vendor names. Such a search may, for instance, look for computer vendors such as IBM, Compaq, Dell, Hewlett Packard, Gateway, etc. If a match occurs, a more specific second level of search may occur at step 72. The search will continue until a match for the particular model and type of computer will occur, at which the search process is complete, at step 74. If no match occurs through the search, the present invention will provide this information, as well, at step 76.

In the present embodiment of the invention, a report of a match occurs at step 78. Here, a blank file, for instance, one having the name "IBM 264535U" file may be generated that relates to a match for the IBM 264535U-based computer. With batch file processing, it is possible to search for an exact match of the computer make and type within the CMOS/BIOS. So, regardless of whether a computer may be in a DOS or 132-platform environment, for example, such information and its use can be readily determined.

Once CMOS/BIOS parsing process completes a search, the present invention records and uses the information specifying the model and type. This makes possible the identification of the desired network drive and image information for migrating to a new operating system. With the type and image data, the CMOS/BIOS parsing process 60 ends, at step 80, which enables the further steps of identifying automatically the type of network card for use with the specific computer. This information, then, allows for the search the necessary network files. If the files exist, then the process of the present invention further entails automatically installing the new operating system, as already described.

The present invention has the ability to store a user's files, settings, and when possible, even applications, without relying on an operating system delivery product. The system of the present invention only requires an FTP server, such as FTP server 29, to satisfy its back-end requirements. Also, back-end platform requirements are satisfied simply through the use of essentially any platform that may run on FTP server 29.

Operating system migration process and associated system 30 are of significant importance due to the ability they provide to detect the particular model of general-purpose computer 10 by parsing the CMOS/BIOS within general-purpose computer 10. Process 30 opens the CMOS/BIOS of general-purpose computer 10 to the computer model and type. For example, for general-purpose computer 10 from well-known vendors such as IBM, Compaq, Gateway, Dell, and HP. Knowing the model/type of general-purpose allows the process of the present invention to dynamically selecting the proper network card driver for a DOS network boot. This eliminates the need for a pre-boot execution environment (PXE) and also allows for dynamically selecting the proper image for a specific PC.

The system of the present invention also provides for dynamic re-configuration of floppy disks during the operating system delivery phase. This ensures uninterrupted automation of the operating system delivery when booting from a floppy disk. This further serves to eliminate the need to enable network boot or a boot from a computerized disk drive 22.

The present invention, therefore, provides a single integrated process and system 30 to backup user data, store the data remotely, and deliver the operating system, and then restore the user's data. The present invention avoids the need to use a multitude of disparate applications and utilities in conjunction with one another to perform operating system migration, instead providing a fully automated migration process. Moreover, the present invention avoids the costly, tedious, and management intensive processes of prior operating system migration systems and processes.

The present inventions reduces the amount of information system specialist time is performing such talks to only a small fraction of that previously required if a refresh across multiple desktops is needed. The present invention, therefore, can significantly reduce the cost of performing the refresh. Additionally, the present invention reduces the total cost of owning and maintaining systems using a number of general-purpose computers 10 by minimizing user downtime, and decreasing information system specialist support calls.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

We claim:

1. A method for migrating a computer operating system to a computer without the use of a pre-boot execution agent, comprising the steps of:

searching automatically the CMOS/BIOS of the computer for detecting dynamically the type of computer network drive for a Disk Operating System Network (DOS) network to boot in migrating the operating system to the computer; and searching automatically the CMOS/BIOS of the computer for selecting dynamically the computer operating system image to be installed in according to image-related information residing within the CMOS/BIOS of the computer.

2. The method of claim 1, further comprising the steps of:

backing up user data files on the computer to a location remote from the computer;

installing in the computer the operating system to which the computer is to migrate; and restoring from the remote location the user data files on the computer.

3. The method of claim 2, further comprising the step of dynamically reconfiguring portable media associated with the computer from a remote location.

4. The method of claim 2, wherein said remote location comprises an FTP Server.

5. The method of claim 4, further comprising the step of communicating with said FTP Server using a standard FTP communications link.

6. The method of claim 2, wherein said backing up step further comprises the steps of:

backing up personal settings relating to a user of the computer; and backing up software application settings specific to the computer.

7. The method of claim 2, wherein said backing up step further comprises the step of backing up contacts data stored in a contacts application program installed on the computer.

8. The method of claim 2, wherein said backing up step further comprises the step of backing up calendar data stored in a calendar application program installed on the computer.

9. The method of claim 2, wherein said FTP Server storage capability may be reduced to approximately the storage requirement for the user data files.

10. The method of claim 2, further comprising the step of specifying the file extensions associated with the user data files using a user interface.

11. The method of claim 2, further comprising the step of specifying the file extensions associated with the user data files using a configuration file.

12. The method of claim 1, wherein said personal computer detecting step further comprises the step of identifying from the CMOS/BIOS the computer manufacturer.

13. A media device comprising instructions for migrating a computer operating system to a computer without the use of a pre-boot execution agent, comprising:

instructions for detecting dynamically the computer type relating to the network device to be booted by a Disk Operating System Network (DOS) network, said instructions further for parsing the CMOS/BIOS of the computer to obtain type information relating to the type of computer network device; and instructions for selecting dynamically the proper image for the computer according to image information within the CMOS/BIOS of the computer.

14. A system for migrating a computer operating system to a computer without the use of a pre-boot execution agent, comprising instructions for:

searching automatically the CMOS/BIOS of the computer for detecting dynamically the type of computer network drive for a Disk Operating System Network (DOS) network to boot in migrating the operating system to the computer; and searching automatically the CMOS/BIOS of the computer for selecting dynamically the computer operating system image to be installed in according to image-related information residing within the CMOS/BIOS of the computer.

15. The system of claim 14, further comprising instructions for:

backing up user data files on the computer to a location remote from the computer;

installing in the computer the operating system to which the computer is to migrate; and restoring from the remote location the user data files on the computer.

16. The system of claim 15, further comprising instructions for dynamically reconfiguring portable media associated with the computer from a remote location.

17. The system of claim 15, wherein said remote location comprises an FTP Server.

18. The system of claim 17, further comprising instructions for communicating with said FTP Server using a standard FTP communications link.

19. The system of claim 15, wherein said backing up instructions further comprise instructions for:

backing up personal settings relating to a user of the computer; and backing up software application settings specific to the computer.

20. The system of claim 15, wherein said backing up instructions further comprise instructions for backing up contacts data stored in a contacts application program installed on the computer.

21. The system of claim 15, wherein said backing up instructions further comprise instructions for backing up calendar data stored in a calendar application program installed on the computer.

22. The system of claim 15, wherein said FTP Server storage capability may be reduced to approximately the storage requirement for the user data files.

23. The system of claim 15, further comprising instructions for specifying the file extensions associated with the user data files using a user interface.

24. The system of claim 15, further comprising instructions for specifying the file extensions associated with the user data files using a configuration file.

25. The system of claim 14, wherein said personal computer detecting step further comprises instructions for identifying from the CMOS/BIOS the computer manufacturer.

26. A system for forming a media device comprising instructions for migrating a computer operating system to a computer without the use of a pre-boot execution agent, comprising instructions for:

storing instructions on the media device for detecting dynamically the computer type relating to the network device to be booted by a Disk Operating System Network (DOS) DG& network, said instructions further for parsing the CMOS/BIOS of the computer to obtain type information relating to the type of computer network device; and storing instructions on the media device for selecting dynamically the proper image for the computer according to image information within the CMOS/BIOS of the computer.

* * * * *